United States Patent [19]

Jang

[11] Patent Number: 5,720,694
[45] Date of Patent: Feb. 24, 1998

[54] HYDRAULIC CONTROL SYSTEM FOR AUTOMATIC TRANSMISSION SYSTEM

[75] Inventor: Jaeduk Jang, Kyungki-do, Rep. of Korea

[73] Assignee: Hyundai Motor Company, Rep. of Korea

[21] Appl. No.: 658,805

[22] Filed: Jun. 7, 1996

[30] Foreign Application Priority Data

Aug. 22, 1995 [KR] Rep. of Korea ............... 95-25934

[51] Int. Cl.$^6$ .................................................. F16H 61/00
[52] U.S. Cl. ........................ 477/116; 477/117; 477/130; 475/121
[58] Field of Search ........................ 477/116, 117, 477/130, 131, 152, 154, 155; 475/122, 123, 128, 127, 129, 121

[56] References Cited

U.S. PATENT DOCUMENTS

| | | | |
|---|---|---|---|
| 4,982,622 | 1/1991 | Yamamoto et al. | 477/116 X |
| 5,085,103 | 2/1992 | Ando et al. | 477/152 |
| 5,134,903 | 8/1992 | Itoh | 477/117 X |
| 5,433,124 | 7/1995 | Person | 477/131 X |
| 5,441,459 | 8/1995 | Inukai et al. | 475/127 |
| 5,507,700 | 4/1996 | Niiyama | 475/129 |
| 5,542,888 | 8/1996 | Takada et al. | 475/129 X |
| 5,569,116 | 10/1996 | Jang | 477/131 X |
| 5,616,093 | 4/1997 | Long et al. | 475/123 X |

*Primary Examiner*—Charles A. Marmor
*Assistant Examiner*—Peter T. Kwon
*Attorney, Agent, or Firm*—Finnegan, Henderson, Farabow, Garrett & Dunner, L.L.P.

[57] ABSTRACT

A hydraulic control system for automatic transmission systems includes: an oil pump, a pressure control valve, a solenoid supply valve, a manual valve, a torque control regulator valve, a control switch valve, an N-D control valve, a 1st–2nd speed shift valve, a 2nd–3rd speed shift valve, a 3rd–4th speed shift valve, a second clutch valve, a third clutch valve, a fourth clutch valve, and an N-R control valve. Accumulators are provided to each supply line of first, second, third and sixth frictional elements to alleviate shock resulting from gear shifting and maintain stability in actuating hydraulic pressure.

11 Claims, 12 Drawing Sheets

FIG.7

| Selection Pattern | | C1 | C2 | C3 | B1 | B2 | B3 | B4 | F1 | F2 | F3 | Engine Brake System |
|---|---|---|---|---|---|---|---|---|---|---|---|---|
| P | | | | | O | | | | | | | |
| R | | | | O | O | | | O | | | | O |
| N | | | | | O | | | | | | | |
| D (O/D ON) | 1 | O | | | O | | | | O | | O | |
| | 2 | O | | | O | O | | | | O | O | |
| | 3 | O | O | | | O | | | | | | |
| | 4 | O | O | | | O | | | | | | O |
| 3 (O/D OFF) | 1 | O | | | O | | | | O | | O | |
| | 2 | O | | | O | O | | | | O | O | |
| | 3 | O | | O | | O | O | | | | | O |
| 2 | 1 | O | | | O | | | | O | | O | |
| | 2 | O | | | O | O | O | | | O | O | O |
| L | 1 | O | | | O | | | O | O | | O | O |

5,720,694

HYDRAULIC CONTROL SYSTEM FOR AUTOMATIC TRANSMISSION SYSTEM

BACKGROUND OF THE INVENTION

1. Field of the Invention

The present invention relates to a hydraulic control system for automatic transmission systems. More particularly, it relates to such a hydraulic control system for automatic transmission systems which provide excellent smoothness in shifting and responsiveness of shifting time by providing accumulators to each supply line of frictional elements to which activating hydraulic pressure is applied, and actuating a second speed shift control portion at 2nd–3rd speed.

2. Description of the Related Art

A conventional vehicle automatic transmission has a torque converter, a multiple stage transmission gear mechanism connected with this torque converter, and frictional elements actuated by hydraulic pressure for selecting one of the gear ratios of the transmission gear mechanism in response to the driving condition of a vehicle.

The hydraulic control system provides actuating hydraulic pressure, pressurized by an oil pump and required to operate the frictional elements and control valves. This hydraulic control system includes a pressure control means for controlling hydraulic pressure generated by an oil pump, manual and automatic shift control means for accomplishing a desired shift mode, hydraulic pressure control means for controlling smooth shifting and responsiveness of gear shifting, a damper clutch control means for actuating a damper clutch of a torque converter, and a hydraulic pressure distribution means for distributing hydraulic pressure to each frictional element.

The above hydraulic pressure control means regulates the line pressure provided respectively to each frictional element, a torque converter, and a solenoid valve; and the line pressure has a substantial effect on shift feeling. The power train whose output terminal has a rotational speed regulated by the hydraulic control system is an assembly of a plurality of planetary gear sets. Each element making up the planetary gear set is controlled by an ON/OFF operation of the frictional elements including a plurality of clutches and kick-down brakes to produce rotating force in response to each shift mode. Hence, the frictional elements preferably, are actuated by the hydraulic pressure regulated by each gear ratio when shifting gears, and the hydraulic pressure for actuating the frictional elements is converted into drive pressure when the automatic shift is achieved.

From such a point of view, Korean Patent Application No. 95-14255 filed in the name of the present applicant has the problem of sluggish responsiveness of shifting time and decreased smoothness in shifting since hydraulic pressure is controlled so that a second speed shift control portion starts its operation at 3rd–4th speed of frequent use by using primary and secondary control means for the speed shift control portion which are subject to much impact caused by shifting gears.

SUMMARY OF THE INVENTION

The present invention is primarily intended for overcoming the above disadvantages, and encompasses a hydraulic control system for automatic transmission systems which provides excellent smoothness in shifting and responsiveness of shifting time by providing accumulators to each supply line of frictional elements to which activating hydraulic pressure is applied, and by actuating a second speed shift control portion at 2nd–3rd speed.

In order to achieve the above object, the present invention includes:

an oil pump that operates when the engine of a vehicle is running to generate hydraulic pressure;

a pressure control valve varying the hydraulic pressure from the oil pump with the driving condition of the vehicle;

a solenoid supply valve providing first, second and third solenoid valves with line pressure supplied through line pressure passages from the pressure control valve;

a manual valve whose ports are converted by selecting a position of a shift lever to provide hydraulic pressure to a drive pressure passage in the drive "D" range, and provides hydraulic pressure to a reverse hydraulic pressure passage in the reverse "R" range;

a torque control regulator valve whose duty ratio is controlled by the third solenoid valve to convert the drive pressure provided from the manual valve into torque pressure;

a control switch valve alternatively supplying the torque pressure provided from the torque control regulator valve to first and second torque pressure passages in response to turning on or off the fourth solenoid valve;

an N-D control valve providing torque pressure to a second frictional element geared to a first frictional element actuated by line pressure of the initial gear-shifting stage to prevent shock from being given to the second frictional element when the speed change gear assembly comes into the drive "D" driving arrangement from the neutral "N" arrangement;

a 1st–2nd speed shift valve whose port conversion is carried out by an ON/OFF control of a fifth solenoid valve when shifting from 1st speed to 2nd speed of the "D" range to provide a second clutch valve with the drive pressure from the manual valve and the torque pressure from the second torque pressure passage;

a 2nd–3rd speed shift valve whose port conversion is carried out by an ON/OFF control of a sixth solenoid valve when shifting from 2nd speed to 3rd speed of the "D" range to provide a third clutch valve with a part of the hydraulic pressure from the third frictional element and the torque pressure from the 1st–2nd speed shift valve;

a 3rd–4th speed shift valve whose port conversion is carried out by an ON/OFF control of a seventh solenoid valve when shifting from 3rd speed to 4th speed of the "D" range to provide a fourth clutch valve with a part of the hydraulic pressure from the fourth frictional element and the torque pressure from the 2nd–3rd speed shift valve;

a second clutch valve providing the third frictional element with the hydraulic pressure from the 2nd–3rd speed shift valve when shifting from 1st speed to 2nd speed of the "D" range, and providing the seventh frictional element with drive pressure from the 3rd–4th speed shift valve when the shift mode is changed to the "L" range;

a third clutch valve providing the fourth frictional element with the hydraulic pressure from the 3rd–4th speed shift valve when shifting from 2nd speed to 3rd speed of the "D" range, and providing the sixth frictional element with drive pressure supplied from the 3rd–4th speed shift valve through the second clutch valve at the 2nd speed of the "2" range;

a fourth clutch valve providing a fifth frictional element with the hydraulic pressure from the 3rd–4th speed shift valve when shifting from 3rd to 4th speed of the "D" range, and providing the sixth frictional element with a part of the hydraulic pressure supplied to the third frictional element when shifting from 2nd to 3rd speed; and an N-R control valve whose port conversion is carried out by an ON/OFF control of the third solenoid valve when the speed change gear assembly comes into the reverse "R" driving arrangement to provide the seventh frictional element with the hydraulic pressure from the manual valve through the reverse hydraulic pressure passage.

It is to be understood that both the foregoing general description and the following detailed description are exemplary and explanatory only and are not restrictive of this invention, as claimed.

BRIEF DESCRIPTION OF THE ATTACHED DRAWINGS

The accompanying drawings, which are incorporated in and constitute a part of this specification, illustrate one embodiment of the invention and together with the description, serve to explain the principles of the invention.

FIG. 7 is a table showing the operation of the power train at each gear ratio in accordance with the present invention;

DETAILED DESCRIPTION OF THE PRESENT INVENTION

Preferred embodiments of the present invention will be described with reference to the accompanying drawings.

Figure 1:
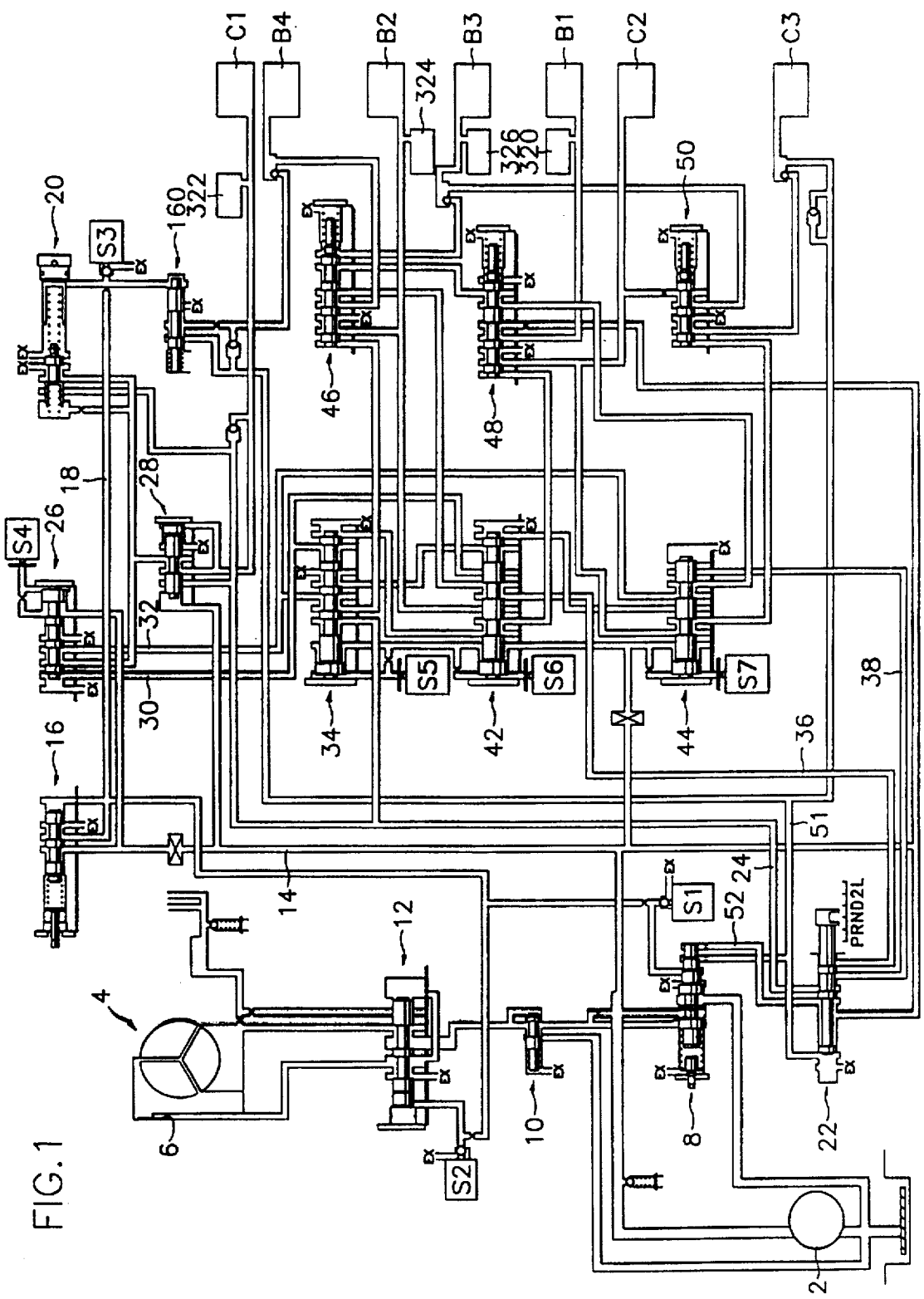
FIG. 1 is a schematic circuit diagram of a hydraulic control system in accordance with the present invention.

FIG. 1 is a schematic circuit diagram of a hydraulic control system in accordance with the present invention. The hydraulic control system includes an oil pump 2 for pumping oil which operates from the driving power of an engine, a torque converter 4 for supplying a rotating force torque of the engine to the input shaft of a transmission gear mechanism, and a damper clutch 6 mounted inside the torque converter 4 to increase power train efficiency.

The hydraulic control system also includes a pressure control valve 8 for varying hydraulic pressure produced from the oil pump with the driving conditions of a vehicle, a converter feed valve 10 for selectively preventing the flow of the hydraulic pressure, and a converter clutch regulating valve 12 for controlling the operation of the damper clutch.

Each port conversion of the pressure control valve 8 and converter clutch regulator valve 12 is achieved by first and second solenoid valves S1 and S2, the duty ratio of which is controlled by a transmission control unit TCU.

Through a line pressure passage 14, the pressure control valve 8 is connected to a solenoid supply valve 16 by which the hydraulic pressure can be supplied to the first and second solenoid valves S1 and S2, and a third solenoid valve S3 via a passage 18.

The third solenoid valve S3 plays a role in port conversion of a torque control regulator valve 20, and this valve 20 is connected to a drive pressure passage 24 and a manual valve 22 for regulating ports in response to the position of a shift lever (not shown) upon receipt of the hydraulic pressure from the line pressure passage 14.

The torque control regulator valve 20 supplies a control switch valve 26 with torque regulated by the third solenoid valve S3, and the torque is transmitted to an N-D control valve 28 reducing the impact occurring by shifting gears from the "N" range to the "D" range. The N-D control valve 28 transmits the torque to a second frictional element C1 geared to a first frictional element B1 working with line pressure at an initial gear-shifting stage, and converts by port conversion the hydraulic pressure for actuating the second frictional element C1 into drive pressure to reduce the impact caused by shifting gears.

A fourth solenoid valve S4 is either turned on or turned off by the TCU to selectively supply first and second passages 30 and 32 with the torque provided to the control switch valve 26. These passages 30 and 32 are connected to a 1st-2nd speed shift valve 34 whose ports are converted by ON/OFF control of a fifth solenoid valve S5 that TCU controls when up shift from 1st speed to 2nd speed is accomplished thereby providing the third frictional element B2 with the drive pressure from the passage 24, and a 2nd-3rd speed shift valve 42 and a 3rd-4th speed shift valve 44 whose port conversion is respectively accomplished, by ON/OFF control of sixth and seventh solenoid valves S6 and S7, and respectively connected to passages 36 and 38 of the manual valve 22 to provide seventh and sixth frictional elements B4 and B3 with actuating hydraulic pressure.

The 2nd-3rd speed shift valve 42 whose ports are converted by an ON/OFF control of the sixth solenoid valve S6 that the TCU controls at 3rd speed, provides a fourth frictional element C2 with a part of the hydraulic pressure that is applied to the third frictional element B2 to accomplish the 3rd speed. The 3rd-4th speed shift valve 44 whose ports are converted by an ON/OFF control of the seventh solenoid valve S7 provides a fifth frictional element C3 with a part of the hydraulic pressure that is applied to the fourth frictional element C2.

A second clutch valve 46 provided with the hydraulic pressure from the 1st-2nd speed shift valve 34 at 2nd speed of the "D" range supplies this hydraulic pressure to the 2nd-3rd speed shift valve simultaneously by providing hydraulic pressure to the 3rd frictional element B2. The second clutch valve 42 is also connected to the 2nd–3rd speed shift valve 42 and the third clutch valve 48 to provide the hydraulic pressure provided therefrom to the seventh and sixth frictional elements B4 and B3. The third clutch valve 48, supplied with the hydraulic pressure from the 2nd–3rd speed shift valve 42, applies the hydraulic pressure to the 3rd–4th speed shift valve 44 simultaneously by providing hydraulic pressure to the fourth frictional element C2 to operate the fourth frictional element C2.

The fourth clutch valve 50 receives the hydraulic pressure from the 3rd–4th speed shift valve 44 to operate the fifth frictional element C3, and is connected to the sixth frictional element B3 to provide a part of the hydraulic pressure thereto.

The hydraulic control system of the present invention is described in detail with reference to FIGS. 2 to 5.

Figure 2:
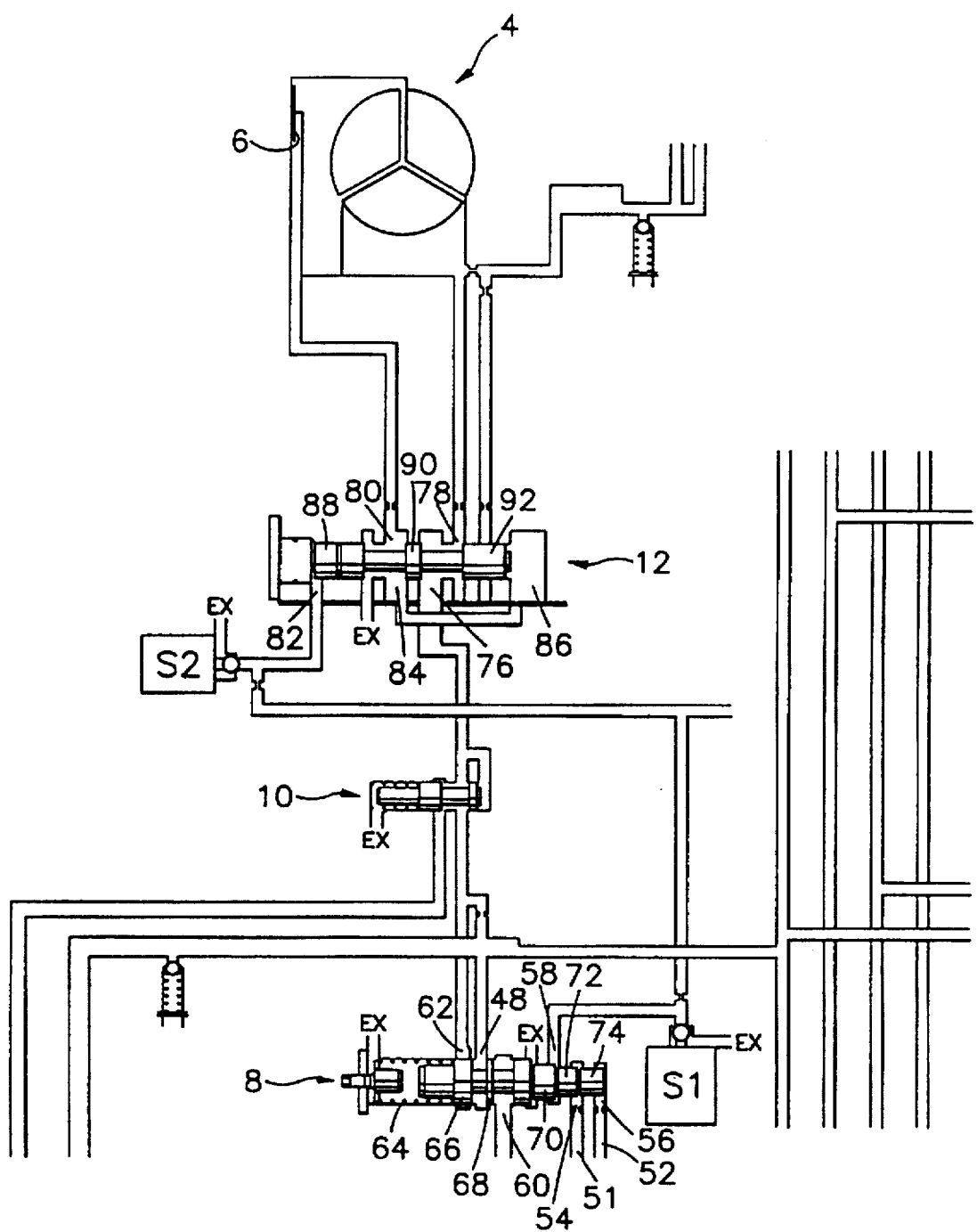
FIG. 2 is an enlarged view of a pressure control portion of the hydraulic control system in accordance with the present invention.

FIG. 2 depicts a pressure control portion of the hydraulic control system in accordance with the present invention.

The pressure control valve 8 making up the pressure control portion includes a first port 48 receiving hydraulic pressure from the oil pump 2, second and third ports 54 and 56 which communicate with a reverse hydraulic pressure passage 51 and a main passage 52 of the manual valve 22 to be provided with hydraulic pressure, and a fourth port 58 to which hydraulic pressure is applied by the first solenoid valve S1. The pressure control valve 8 also includes a fifth port 60 discharging extra hydraulic pressure, and a sixth port 62 providing hydraulic pressure to the control feed valve 10.

A valve spool of the pressure control valve 8 includes a first land 66 having an elastic member 64 on one side to open or close the sixth port 62; a second land 68 releasing oil by regulating the opening degree of the fifth port 60; an exit; and third, fourth and fifth lands 70, 72 and 74 on which hydraulic pressure provided to the fourth, second and third ports 58, 54 and 56 is acting.

The converter feed valve 10 provided with the hydraulic pressure from the sixth port 62 is connected to a converter clutch control valve 12 to provide the hydraulic pressure thereto. The converter clutch control valve 12 for controlling application or release of the damper clutch 6 of the torque converter 4 provides oil to each lubricating device, which is performed by the second solenoid valve S2 that the TCU controls.

The converter clutch control valve 12 has a first port 76 provided with hydraulic pressure, a second port 78 supplying the hydraulic pressure to actuate the damper clutch 6, and a third port 80 supplying the hydraulic pressure to turn off the damper clutch 6. The converter clutch control valve 12 also has a fourth port 82 for providing or cutting off the hydraulic pressure to the second solenoid valve S2, and fifth and sixth ports 84 and 86 providing hydraulic pressure against the one discharged to the fourth port 82.

A valve spool of the converter clutch control valve 12 has a first land 88 on which the hydraulic pressure that flows to the fourth port 82 is acting, a second land 90 designed to allow the first port 76 to alternatively communicate with the second and third ports 78 and 80, and a third land 92 on which the hydraulic pressure that flows to the sixth port 86 is acting.

Figure 3:
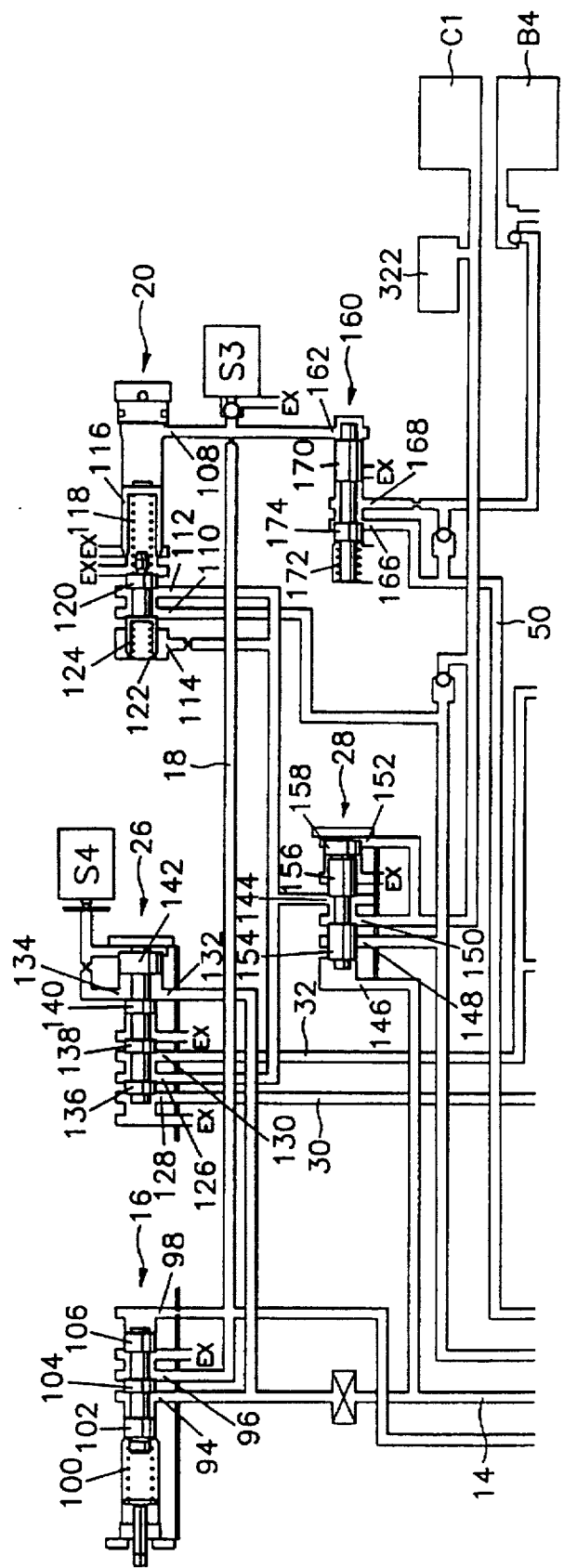
FIG. 3 is an enlarged view of a torque conversion and supply portion of the hydraulic control system in accordance with the present invention.

FIG. 3 is an enlarged view of a torque conversion and supply portion of the hydraulic control system in accordance with the present invention.

A solenoid supply valve 16 for supplying the first, second and third solenoid valves S1, S2 and S3 with line pressure discharged from the pressure control valve 8 via the passage 14, includes a first port 94 communicating with the passage 14, a second port 96 providing a passage 18 with hydraulic pressure flowing to the first port 94, and a third port 98 provided with the hydraulic pressure that is discharged through the second port 96 to control port conversion.

A valve spool of the solenoid supply valve 16 includes a first land 102 having an elastic member 100 on one side, a second land 104 varying the opening degree of the second port 96, and a third land 106 on which the hydraulic pressure supplying to the third port 98 is acting.

The torque control regulator valve 20 whose ports are converted by an ON/OFF combination of the third solenoid valve S3, includes a first port 108 provided with hydraulic pressure, a second port 110 supplied with hydraulic pressure supplied from the manual valve 22 via the passage 24, and third and fourth ports 112 and 114 to which the hydraulic pressure is selectively provided in response to the port conversion.

The above valve 20 includes a first plug 116 moving by the hydraulic pressure provided to the first port 108, an elastic member 118 elastically supporting this plug 116, a land 120 elastically supported by the other side of the elastic member 118, and a second plug 124 elastically suspended by a second elastic member 122.

A control switch valve 26 selectively provided with the hydraulic pressure from the second and third ports 110 and 112, includes a first port 126 supplied with the hydraulic pressure from the third port 112 of the torque control regulator valve 20, second and third ports 128 and 130 to which the hydraulic pressure provided to the first port 126 is selectively discharged, a fourth port 132 to which the hydraulic pressure is applied from the passage 14, and a fifth port 134 communicating with the fourth solenoid valve S4 for applying the hydraulic pressure to a spool of the valve 26 in a direction opposite to the one of the fourth port 132.

The valve spool of the control switch valve 26 has a first land 136 for either closing or opening the first and second ports 126 and 128, a second land 138 for either closing or opening the first and third ports 126 and 130, a third land 140 to which the hydraulic pressure of the fourth port 132 is applied, and a fourth land 142 to which the hydraulic pressure of the fifth port 134 is applied.

The N-D control valve 28 provided with the torque from the torque control regulator valve 20 and alleviating shock caused when the shift mode is changed from the "N" range to the "D" range, includes a first port 144 to which torque is applied, a second port 146 to which line pressure is applied, a third port 148 to which drive pressure is applied, a fourth port 150 providing the first frictional element C1 with the hydraulic pressure that is applied to the third port 148, and a fifth port 152 provided with the hydraulic pressure from the fourth port 150 to achieve the port conversion.

A valve spool of the N-D control valve 28 has a first land 154 over which the hydraulic pressure of the second port 146 acts, a second land 156 cutting off the hydraulic pressure provided to the first port 144, and a third land 158 over which the hydraulic pressure provided to the fifth port 152 is acting.

The N-R control valve 160, providing hydraulic pressure to the seventh frictional element B4 that is actuated at reverse mode, includes a first port 162 provided with the hydraulic pressure of the third solenoid valve S3, a second port 166 provided with the reverse hydraulic pressure from the manual valve 22 through the passage 51, and a third port 168 for providing the sixth frictional element B3 with the reverse hydraulic pressure provided to the second port 166.

A valve spool of the N-R control valve 160 has a first land 170 over which the hydraulic pressure provided to the first port 162 acts, and a second land 174 elastically suspended by an elastic member 172 to support the second port 166.

Figure 4:
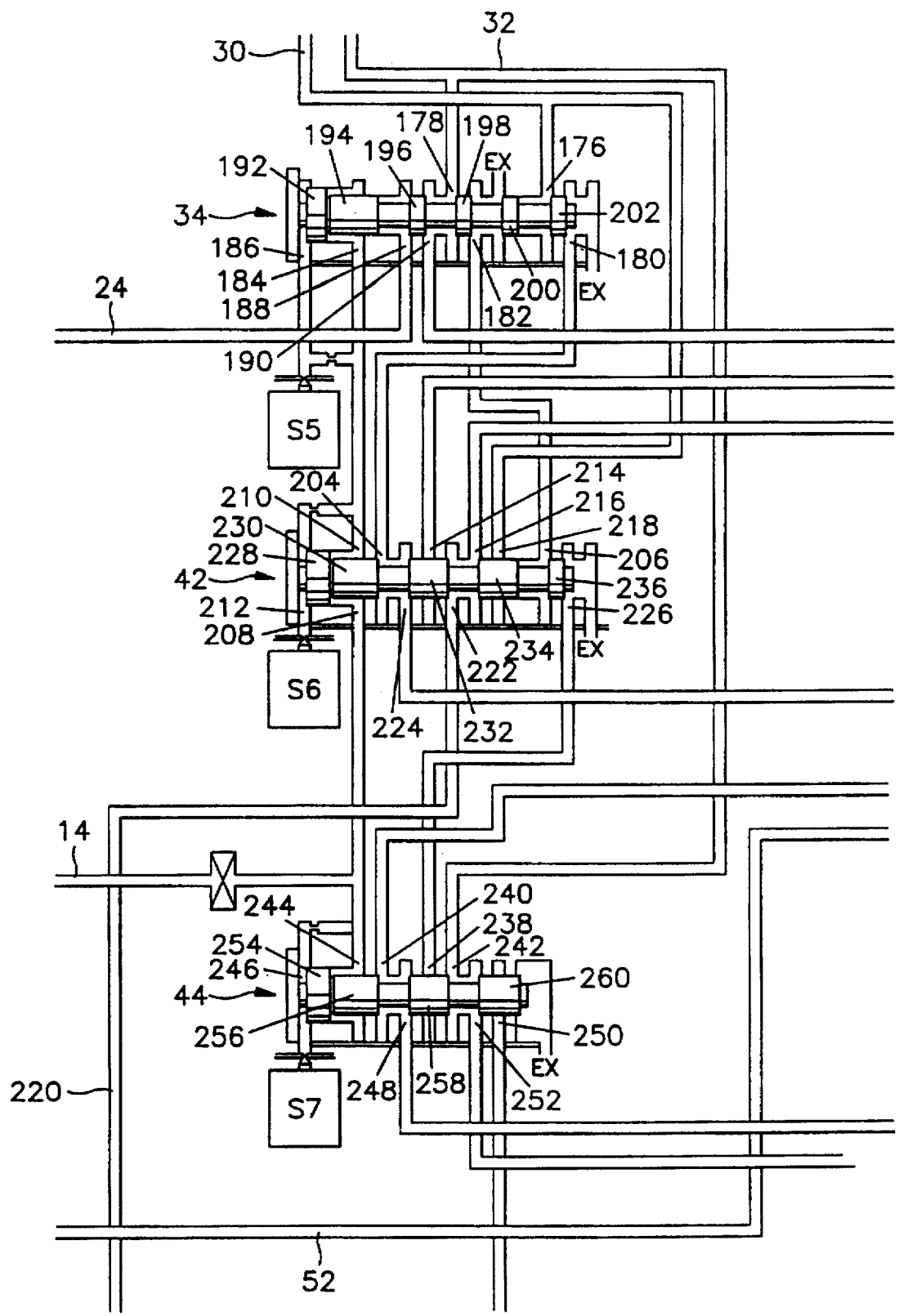
FIG. 4 is a circuit diagram showing the combination of speed shift valves of the hydraulic control system in accordance with the present invention.

FIG. 4 is a circuit diagram showing the combination of speed shift valves of the hydraulic control system in accordance with the present invention.

The 1st–2nd speed shift valve 34 for providing the actuating hydraulic pressure to the third frictional element B2 when shifting gears from 1st speed to 2nd speed of the "D" range, has first and second ports 176 and 178 provided with torque from the passages 30 and 32, respectively, a third port 180 providing any one of the ports of the 2nd–3rd speed shift valve with the hydraulic pressure applied to the first port 176, and a fourth port 182 providing another port of the 2nd–3rd speed shift valve 42 with the hydraulic pressure applied to the second port 178.

The 1st–2nd speed shift valve 34 has a fifth port 184 provided with the hydraulic pressure from the passage 14 via the 2nd–3rd speed shift valve 42, a sixth port 186 provided with this hydraulic pressure controlled by an ON/OFF combination of the fifth solenoid valve S5, a seventh port 188 provided with the hydraulic pressure from the passage 24, and an eighth port 190 providing the second clutch valve 46 with the hydraulic pressure applied to the seventh port 188.

A valve spool of the 1st–2nd speed shift valve 34 includes a first land 192 over which the hydraulic pressure provided to the fifth and sixth ports 184 and 186 is acting, a second land 194 over which the hydraulic pressure of the seventh port 188 acts, and a third land 196 for allowing the eighth port 190 to communicate or be cut off with the seventh port 188. The valve spool also includes a fourth land 198 that allows the second port 178 to selectively communicate with the seventh port 188 or the eighth port 190, a fifth land 200 which a part of the hydraulic pressure flowing to the first port 176 acts on, and a sixth land 202 which the hydraulic pressure provided to the third port 180 acts on.

The 2nd–3rd speed shift valve 42, providing hydraulic pressure to the fourth and sixth frictional elements C2 and B3 when shifting from 2nd to 3rd speed, includes a first port 204 connected to the third port 180 of the 1st–2nd speed shift valve 34 to be provided with hydraulic pressure, a second port 206 connected to the fifth port 182 of the 1st–2nd speed shift valve 34 to be provided with hydraulic pressure, and a third port 208 to which the hydraulic pressure of the passage 14 is provided.

The 2nd–3rd speed shift valve 42 also includes a fourth port 210 providing the hydraulic pressure of the third port 208 to the fifth and sixth ports 184 and 186 of the 1st–2nd speed shift valve 34, a fifth port 212 provided with the line pressure of the fourth port 210 controlled by the sixth solenoid valve S6, and a sixth port 214 to which a part of the hydraulic pressure is applied to the fifth frictional element C3.

The 2nd–3rd speed shift valve 42 further includes a seventh port 216 selectively providing the third clutch valve 48 with the hydraulic pressure supplied to the first and sixth ports 204 and 214, an eighth port 218 directly communicating with the passage 30, a ninth port 222 communicating with a passage 220 to which hydraulic pressure is applied in the "L" range, a tenth port 224 providing the third clutch valve 48 with the hydraulic pressure applied to the sixth port 214, and an eleventh port 226 providing any one of ports of the 3rd–4th speed shift valve with the hydraulic pressure flowing to the second port 206.

A valve spool of the 2nd–3rd speed shift valve 42 includes a first land 228 which the hydraulic pressure of the third and fifth ports 208 and 212 acts on both sides thereof, a second land 230 which a part of the hydraulic pressure of the first port 204 acts on, a third land 232 allowing the sixth port 214 to selectively communicate with the tenth port 224, a fourth land 234 allowing the seventh port 216 to selectively communicate with the eighth port 218, and a fifth land 236 allowing the second port 206 to selectively communicate with the eleventh port 226.

The 3rd–4th speed shift valve 44 that provides hydraulic pressure not to operate the sixth frictional element B3 and to operate the fifth frictional element C3 when shifting from 3rd speed to 4th speed, has a first port 238 provided with hydraulic pressure from the eleventh port 226 of the 2nd–3rd speed shift valve 42, a second port 240 provided with a part of the hydraulic pressure applied to the second frictional element C1, and a third port 242 connected to the passage 32.

The 3rd–4th speed shift valve 44 also includes a fourth port 244 provided with the line pressure from the passage 14, a fifth port 246 provided with the line pressure controlled by the fifth solenoid valve S7, a sixth port 248 providing the fourth clutch valve 50 with the hydraulic pressure of the first port 238, a seventh port 250 provided with drive pressure from the manual valve 22 in "2" and "L" ranges, and an eighth port 252 providing the hydraulic pressure of the seventh port 250 with the sixth frictional element B3 via the third and second clutch valves 48 and 46.

A valve spool of the 3rd–4th speed shift valve 44 includes a first land 254 which the hydraulic pressure of the fourth and fifth ports 244 and 246 acts on both sides thereof, a second land 256 on which a part of the hydraulic pressure applied to the second port 240 is acting, a third land 258 allowing the third port 242 to selectively communicate with the eighth port 252, and a fourth land 260 allowing the seventh port 242 to selectively communicate with the eighth port 252.

Figure 5:
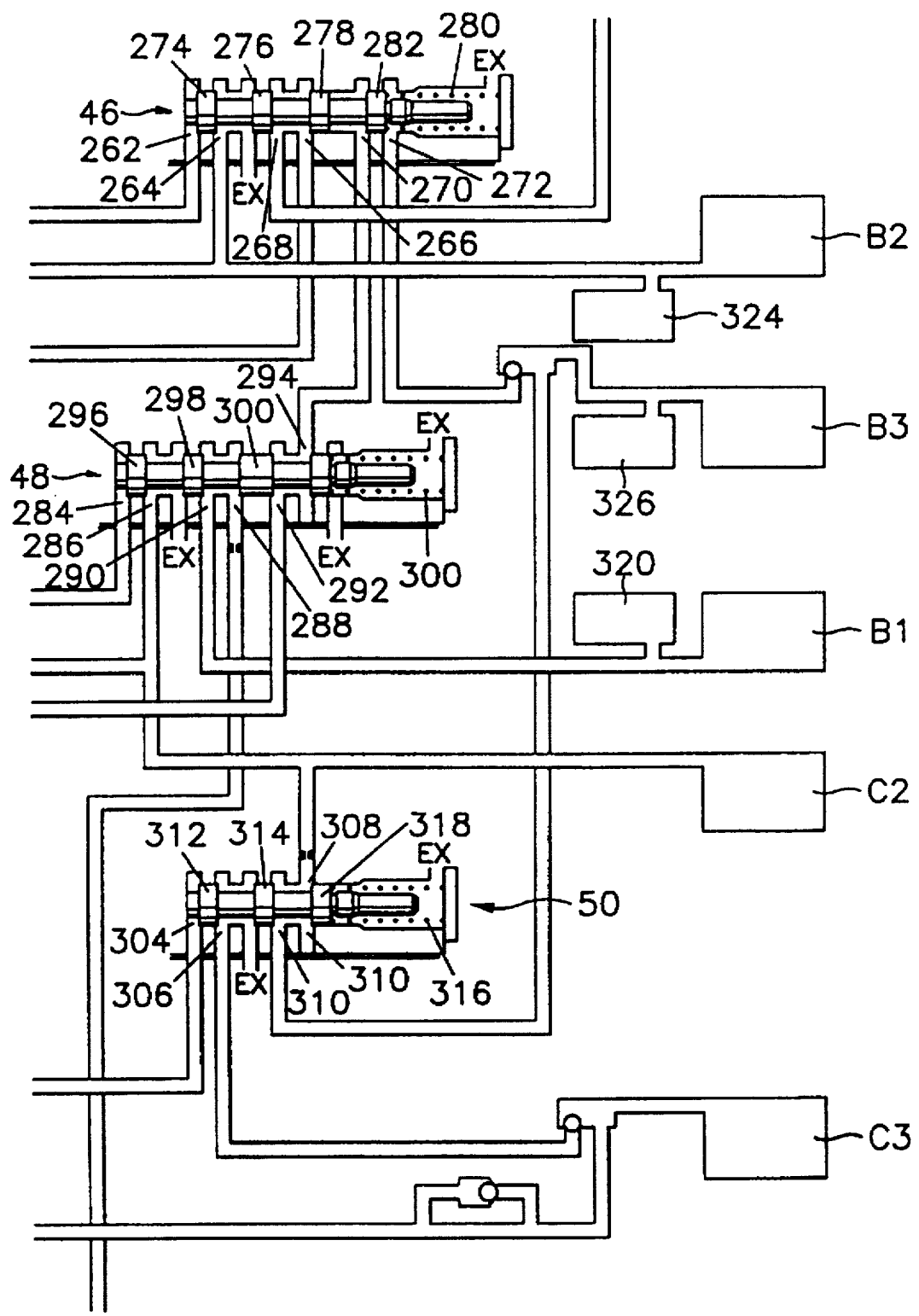
FIG. 5 is a circuit diagram showing the combination of clutch valves and brake valves of the hydraulic control system in accordance with the present invention.

FIG. 5 is a circuit diagram showing the combination of clutch and brake valves selectively providing hydraulic pressure to each frictional element.

The second clutch valve 46 to which hydraulic pressure is applied from the 1st–2nd speed shift valve 34, a first port 262 provided with the hydraulic pressure from the 1st–2nd speed shift valve 34, a second port 264 providing the third frictional element B2 and 2nd–3rd speed shift valve 36 with the hydraulic pressure of the first port 262, and a third port 266 provided with the hydraulic pressure from the seventh port 216 of the 2nd–3rd speed shift valve 42.

The valve 46 also includes a fourth port 268 applying the hydraulic pressure of the third port 282 to the seventh frictional element B4, a fifth port 270 communicating with any one of the ports of the third clutch valve 48 to be supplied with hydraulic pressure, and a sixth port 272 providing the sixth frictional element B3 with the hydraulic pressure applied to the fifth port 270.

A valve spool of the second clutch valve 46 includes a first land 274 allowing the first port 262 to selectively communicate with the second port 264, a second land 276 allowing the third port 266 to selectively communicate with the fourth port 268, a third land 278 for shutting off the third port 266 with the fifth port 270, and a fourth land 282 elastically suspended by an elastic member 280 and allowing the fifth port 270 to selectively communicate with the sixth port 272.

The third clutch valve 48 provided with the hydraulic pressure from the manual valve 22 and 2nd–3rd speed shift valve 42 to apply the hydraulic pressure to the first and fourth frictional elements B1 and C2, includes a first port 284 receiving the hydraulic pressure from the 2nd–3rd speed shift valve 42, a second port 286 providing the hydraulic pressure applied to the first port 284 to the fourth frictional element C2, 3rd–4th speed shift valve 44, and a fourth clutch valve 50, and a third port 288 provided with the drive pressure of the manual valve 22 in the "D" range. The third clutch valve 48 also has a fourth port 290 providing the first frictional element B1 with the hydraulic pressure applied to the third port 288, a fifth port 292 communicating with the eighth port 252 of the 3rd–4th shift valve 38, and a sixth port 294 providing the hydraulic pressure of the fifth port 292 to the fifth port 270 of the second clutch valve 46.

A valve spool of the third clutch valve 48 includes a first land 296 allowing the first port 284 to selectively communicate with the second port 286, a second land 298 selectively communicating the third port 288 with the fourth port 290, and a third land 302 supported by an elastic member 300.

The fourth clutch valve 50 that provides actuating hydraulic pressure to the sixth frictional element B3 at 3rd speed of the "D" range and supplies hydraulic pressure to the fifth frictional element C3 at 4th speed, includes a first port 304 provided with the hydraulic pressure from the 3rd–4th speed shift valve 44, a second port 306 providing the fifth frictional element C3 with the hydraulic pressure applied to the first port 304, a third port 308 provided with a part of the hydraulic pressure applied to the fourth frictional element C2, and a fourth port 310 providing the sixth frictional element B3 with the hydraulic pressure applied to the third port 308.

A valve spool of the fourth clutch valve 50 has a first land 312 allowing the first port 304 to selectively communicate with the second port 306, a second land 314 allowing the third port 308 to selectively communicate with the fourth port 310, and a third land 318 suspended by an elastic member 316.

Accumulators 320, 322, 324 and 326 are respectively provided to the first, second, third and sixth frictional elements B1, C1, B2 and B3. The fifth frictional element C3 communicates with the passage 51 to be provided with hydraulic pressure directly from the manual valve 22 in the "R" range.

Figure 6:
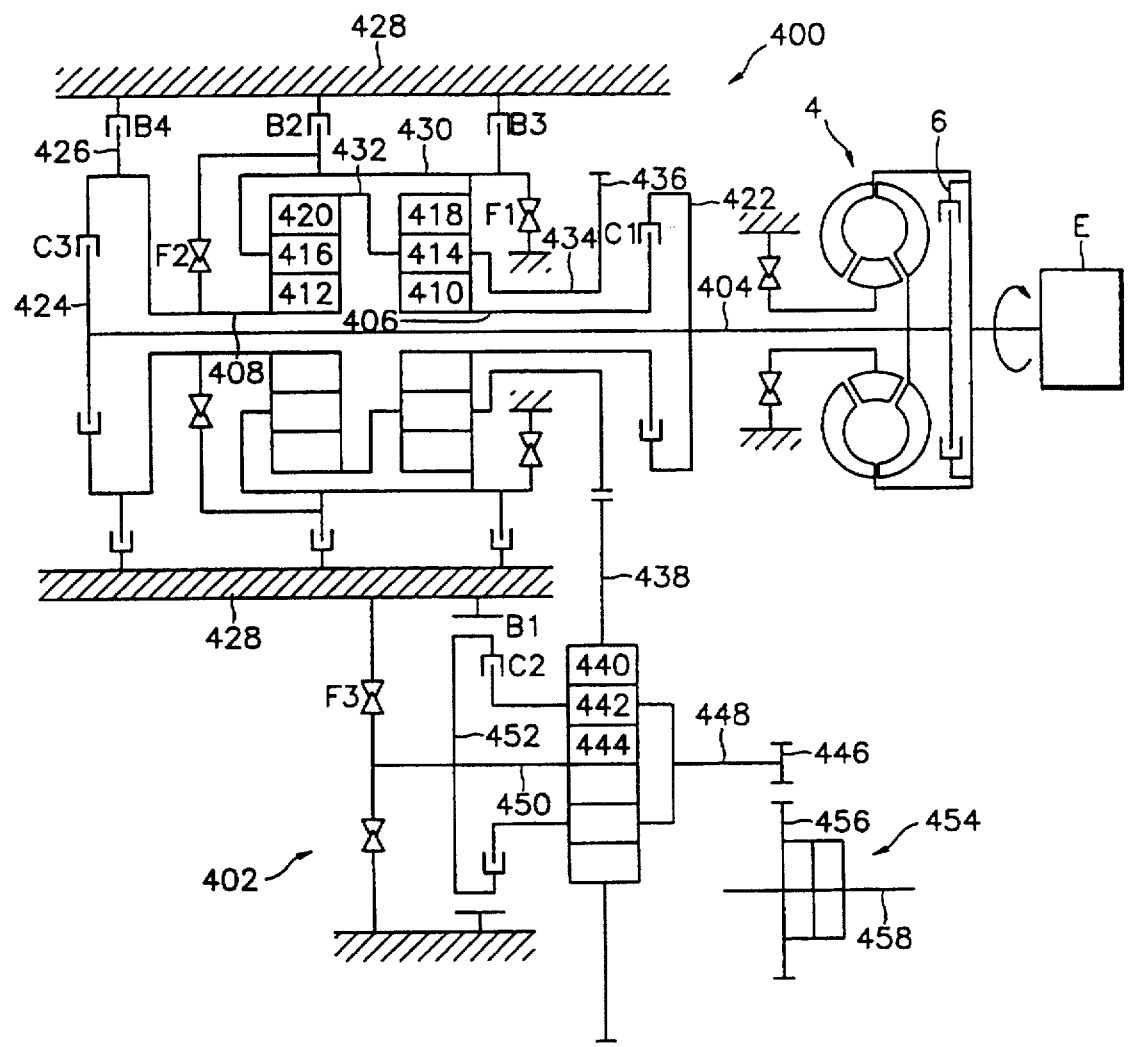
FIG. 6 is a circuit diagram of a power train in accordance with the present invention.

FIG. 6 is a circuit diagram of a power train controlled by the hydraulic control system to achieve the same shifting effect as the transmission gear. Similar reference numerals denote similar elements. The power train includes the torque converter 4 provided with power of an output shaft of the engine E and rotating, a first speed shift control portion 400 having a planetary gear set to receive the hydraulic torque converted by the torque converter 4 thereby producing it at a proper reduction ratio, and a second speed shift control portion 402 having a planetary gear set to reduce the gear ratio of the first speed shift control portion 400.

The torque converter 4 has an impeller combined with a crank shaft of the engine to receive torque, a turbine oppositely disposed to the impeller to turn by oil from the pump, and a stator interposed between the impeller and turbine used for deflection of oil at low speeds and moving with the pump and turbine at high speeds, increasing the torque of the impeller.

The first speed shift control portion 400 is a combination of two planetary gear systems on a first shaft 404 connected to the impeller, and on the first shaft 404, second and third shafts 406 and 408 having a hollow shaft respectively to be free from rotational interference with the first shaft 404. First and second sun gears 410 and 412 formed on the second and third shafts, respectively, and first and second pinion gears 414 and 416 mesh with each other on the outside of the first and second sun gears 410 and 412. First and second ring gears 418 and 420 mesh with each other on the outside of the first and second pinion gears 414 and 416.

The second frictional element and fifth frictional element C3 are respectively connected to first and second hubs 422 and 424 on both sides of the first shaft 404 in a manner that the first and second sun gears 410 and 412 on the second and third shafts 406 and 408 selectively become an input element, and a first power transmission member 426 connecting the third shaft 408 to the fifth frictional element C3 is connected to a transmission gear housing 428 by inserting the seventh frictional element B4 thereto.

The second pinion gear 416 is connected to the first ring gear 418 by a second power transmission member 430, to which the transmission gear housing 428 is connected by inserting a first one-way clutch F1 and the sixth frictional element B3 thereto. The first pinion gear 414 is connected to the second ring gear 420 and a third power transmission member 432 in a manner that a fourth power transmission member 434 formed extending over the third power transmission member 432 becomes an output element.

The first one-way clutch F1 prevents the second power transmission member 430 from turning against the engine at 1st speed of "D", "2" and "L" ranges in a manner that the second power transmission member 430 serves as a reactant thereagainst.

The fourth power transmission member 434 has a first output gear 436 of the first speed shift control portion 400 on one end.

The third shaft 408 is connected to the transmission gear housing 428 by inserting a second one-way clutch F2 and the third frictional element B2. The second one-way clutch allows the third shaft 408 to turn in the same direction as that of the engine, and prevents it from rotating against the engine. The third frictional element B2 is actuated at 2nd, 3rd and 4th speeds of the "D" range and at 2nd speed of the "2" range.

The second speed shift control portion 402 repeatedly reducing the torque from the first output gear 436 of the first speed shift control portion 400, includes a third pinion gear 442 that meshes with the inside of the third ring gear 440 having an input gear 438 that meshes with the first output gear 436 on the outside, and the third pinion gear 442 has a planetary gear system meshing with the outside of a third sun gear 444.

The third pinion 442 is connected to each other by a fifth power transmission member 448 in which a second output gear 446 is mounted, and the fifth power transmission member 448 is connected to the third pinion 442 by inserting a sixth power transmission member 452 integrally formed to a fourth shaft 450 rotatably supporting the third sun gear 444 and the fourth frictional element C2. The sixth power transmission member 452 is connected thereto by inserting the transmission gear housing 428 and the first frictional member B1.

A third one-way clutch F3 inserted between the transmission gear housing 428 prevents the fourth shaft 450 from turning against the rotation of the engine, and the second output gear 446 meshes with a final reduction gear 456 of a differential 454. The following description relates to the gear shifting process of the inventive transmission system at each gear ratio using the hydraulic control system and power train as described above.

When the car is starting from a dead stop, the first solenoid valve S1 is turned on to vary hydraulic pressure provided to the fourth port 58 of the pressure control valve 8. Since this causes an increase or reduction in the hydraulic pressure acting on the third land 70, the fifth port 60 communicates with the first port 48 to either release or shut off hydraulic pressure produced from the oil pump 2.

The line pressure that is regulated thereby is provided to the first port 94 of the solenoid supply valve 16 to be produced through the second port 96. A part of the hydraulic pressure discharged to the second port 96 is applied to the third port 98 to act on the right side of the third land 106 in a manner that the valve spool of the solenoid supply valve 16 is moved to the left end when viewed in the drawing.

The second land 104 partially cuts off the second port 96 thereby, and the hydraulic pressure provided to the third port 98 through the second port 96 is lowered to move the valve spool to the right end by the elastic member 100.

The hydraulic pressure discharged through the second port 96 is applied to the first port 108 of the torque control regulator valve 20 through such an action, and the ON/OFF operation of the third solenoid valve S3 increases or decreases the hydraulic pressure provided to the first port 108 whereby the movement of the first plug 116 is changed.

When the third solenoid valve S3 is turned off, the first plug 116 is moved to the left end when viewed in the drawing to compress the elastic member 118. Thus, the land 120 on which the elastic force of the elastic member 118 acts is moved to the left end.

When the shift mode is changed from the "N" range to the "D" range, a part of the hydraulic pressure of the line pressure passage 14 is provided to the first frictional element B1 via the fourth clutch valve 50 to be operated thereby.

Part of the line pressure is converted into drive pressure through the manual valve 22, and the third solenoid valve S3 turns this drive pressure into torque pressure in the torque control regulator valve 20. The torque pressure passes through the N-D control valve 28 to attain 1st-speed shift by the operation of the second frictional element C1 and the N-D accumulator 322.

The driving hydraulic pressure of the second frictional element C1 moves the valve spool of the N-D control valve 28 from the right to the left thereby becoming drive pressure directly. The completion of the change in speed is then accomplished by the operation of the first and second frictional elements B1 and C1 at 1st speed of "D" range, which is understood from FIG. 8.

Figure 8:
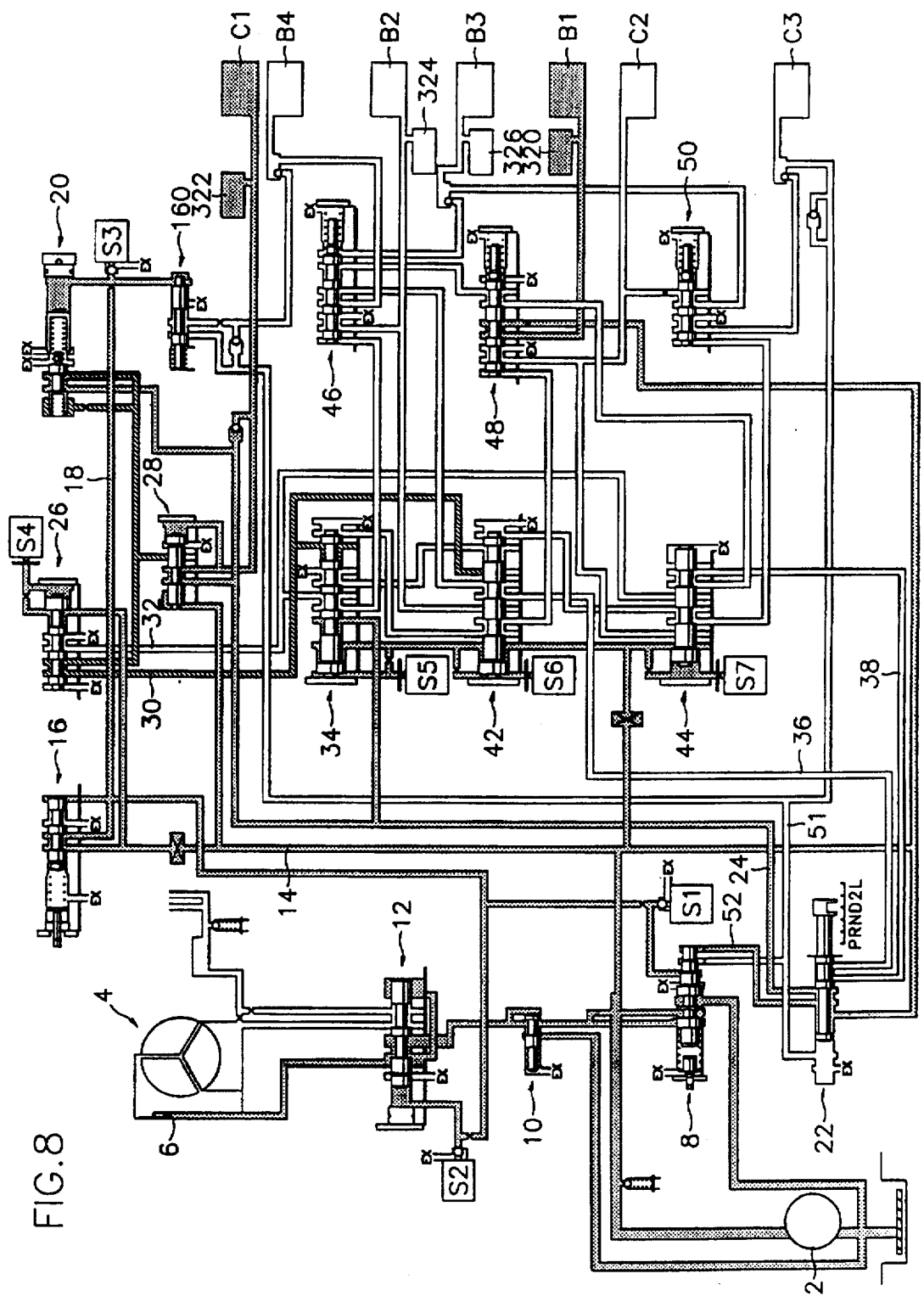
FIG. 8 is a circuit diagram of a first-speed shift of the hydraulic control system in accordance with the present invention.

The hydraulic pressure shown as hatched lines in FIG. 8 indicates torque pressure, and stands by in the first port 176 of the 1st–2nd speed shift valve 34 and the eighth port 218 of the 2nd–3rd speed shift valve 42 via the first passage 30 at the 1st speed. When the first and second frictional elements B1 and C1 are operated as mentioned above, the power train attains a 1st-speed shift.

When there is an increase in car speed or in the opening degree of a throttle valve under the condition, the fourth solenoid valve S4 is turned on to move the valve spool of the control switch valve 26 to the right end when viewed in the drawing. Torque pressure provided to the first port 126 in this manner, is applied through the third port 130 to the second port 178 of the 1st–2nd speed shift valve 34 via the passage 32.

Figure 9:
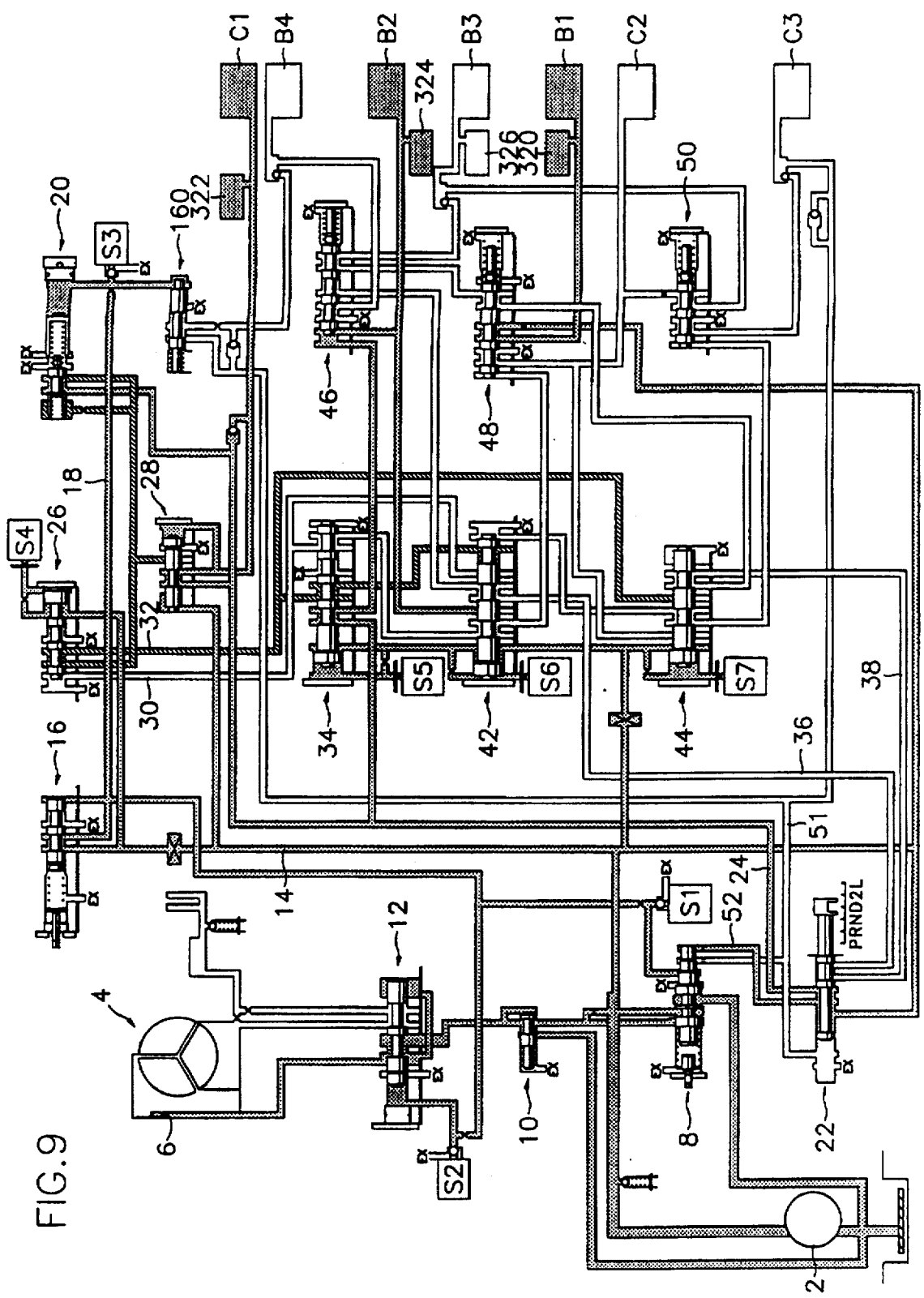
FIG. 9 is a circuit diagram of a second-speed shift of the hydraulic control system in accordance with the present invention.

The valve spool of the 1st–2nd speed shift valve 34 is disposed on the left end as shown in FIG. 9, and the hydraulic pressure provided to the second port 178 passes through the eighth port 190 to be applied to the first port 262 of the second clutch valve 46. The torque pressure acts on one side of the first land 274 of the second clutch valve 46. Its valve spool resists the elastic force of the elastic member 280, and is moved to the right end when viewed in the drawing to allow the first port 262 to communicate with the second port 264. The torque pressure provided to the first port 262 is first applied to the third frictional element B2 to start gear shifting from 1st to 2nd speed.

The valve spool of the 1st–2nd speed shift valve is moved to the right end in response to turning off the fifth solenoid valve S5 in a manner that the seventh port 188 communicates with the eighth port 190 to provide the eighth port 190 with the drive pressure applied to the seventh port 188.

Referring to FIG. 9, the third frictional element B2 is actuated by torque pressure at an initial stage of gear shifting, and is then operated by drive pressure to complete the shift to a 2nd speed at which the first, second and third frictional elements B1, C1 and B2 are actuated to complete the 2nd-speed shift. The power train then runs at the 2nd speed by the operation of the first, second and third frictional elements B1, C1 and B2.

When there is an increase in car speed or in the opening degree of the throttle valve, the fourth solenoid valve S4 is turned off, with the first, second and third frictional elements B1, C1 and B2 being operated, to move the valve spool of the control switch valve 26 to the left end when viewed in the drawing. The torque pressure provided to the first port 126 is applied to the first port 176 of the 1st–2nd speed shift valve 34 via the passage 30 through the second port 128.

Figure 10:
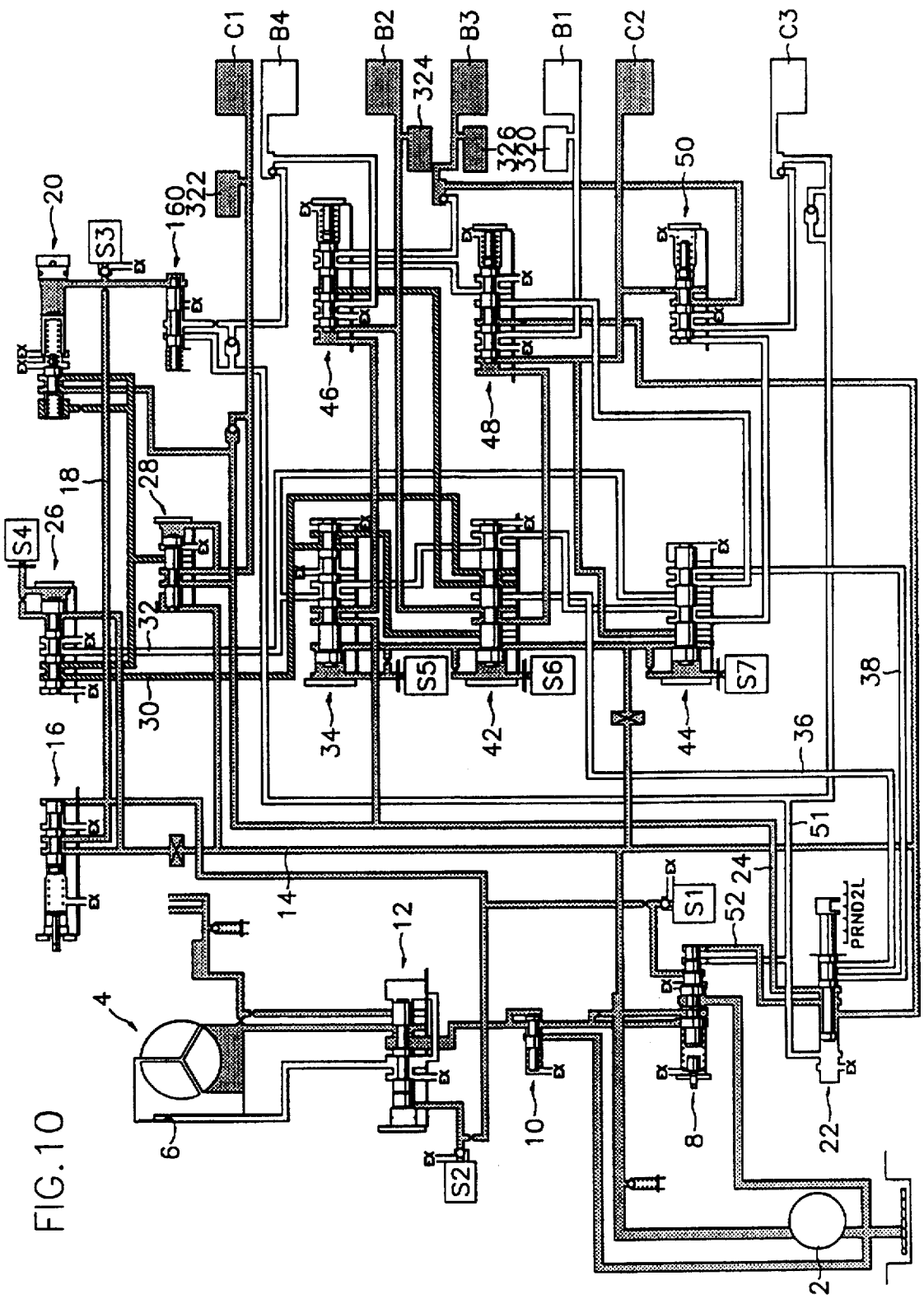
FIG. 10 is a circuit diagram of a third-speed shift of the hydraulic control system in accordance with the present invention.

The valve spool of the 1st–2nd speed shift valve 34 is on the right end, and the hydraulic pressure applied to the first port 176 is provided to the first port 204 of the 2nd–3rd speed shift valve 42 through the third port 180. At this point, the valve spool of the 2nd–3rd speed shift valve 42 is kept on the left as shown in FIG. 10, and the first port 204 communicates with the tenth port 224 in a manner that the hydraulic pressure applied to the first port 204 is applied to the first port 284 of the third clutch valve 48 through the seventh port 216.

Since the torque pressure is acting on the first land 296 of the third clutch valve 48, the valve spool resists the elastic force of the elastic member 300 to be moved to the right end, when viewed in the drawing, to allow the first port 284 to communicate with the second port 286. Simultaneously with this, the third port 288 and the fourth port 290 do not communicate with each other, and the torque pressure applied to the first port 284 is first provided to the fourth frictional element C2 via the second port 286 to shut off the hydraulic pressure that was supplied to the first frictional element B1.

Part of the hydraulic pressure provided to the fourth frictional element C2 passes through the third and fourth ports 308 and 310 of the fourth clutch valve 50 and actuates the sixth frictional element B3 to start gear shifting from 2nd to 3rd speed. The valve spool of the 2nd–3rd speed shift valve 42 is moved to the right end by turning off the sixth solenoid valve S6 in a manner that allows the sixth port 214 to communicate with the seventh port 216. The torque pressure provided to the first port 204 is then shut off, and the drive pressure applied to the sixth port 214 is provided to the seventh port 216 to actuate the fourth and sixth frictional elements C2 and B3 thereby.

The fourth and sixth frictional elements C2 and B3 are actuated by torque pressure at an initial stage of gear shifting, and is then operated by drive pressure to accomplish the 3rd-speed shift at which the second, third, fourth and sixth frictional elements C1, B2, C2 and B3 are actuated to complete the 3rd-speed shift. The power train then runs at the 3rd speed by the operation of the second, third, fourth and sixth frictional elements C1, B2, C2 and B3.

When there is an increase in either car speed or in the opening degree of the throttle valve at this point, the fourth solenoid valve S4 is turned off, with the second, third, fourth and sixth frictional elements C1, B2, C2 and B3 being operated to move the valve spool of the control switch valve 26 to the right end when viewed in the drawing. The torque pressure provided to the first port 126 through this action is applied to the first port 176 of the 1st–2nd speed shift valve 34 via the passage 32 through the third port 130.

Figure 11:
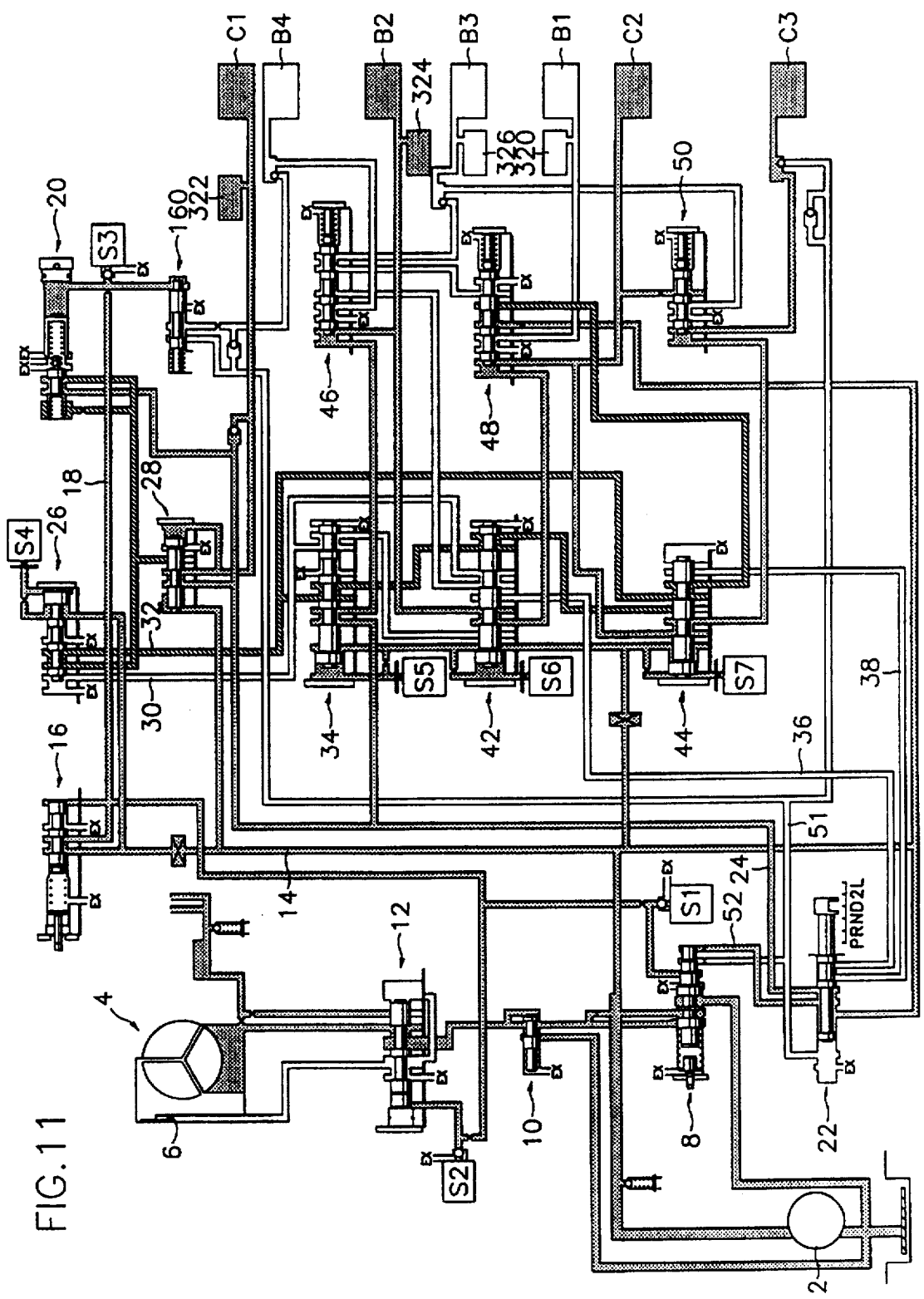
FIG. 11 is a circuit diagram of a fourth-speed shift of the hydraulic control system in accordance with the present invention.

Each of the 1st–2nd and 2nd–3rd speed shift valves 34 and 42 is kept on the right as shown in FIG. 11, and the 1st–2nd speed shift valve 34 allows the second port 178 to communicate with the fourth port 182. The 2nd–3rd speed shift valve 42 keeps the second port 206 communicating with the eleventh port 226, and the hydraulic pressure applied to the second port 178 is provided to the first port 238 of the 3rd–4th speed shift valve 44 through these valves.

The valve spool of the 3rd–4th speed shift valve 44 is kept on the right as shown in FIG. 11, and torque pressure is applied to the first port 304 of the fourth clutch valve 38 through the first and sixth ports 238 and 248.

The above torque pressure acts on one side of the first land 312 of the fourth clutch valve 50, and the valve spool resists the elastic force of the elastic member 316 to be moved to the right end when viewed in the drawing in such a manner that the third and fourth ports 308 and 310 do not communicate with each other. The line pressure that was provided to the sixth frictional element B3 is then cut off, and the first port 304 communicates with the second port 306 to provide, through the second port 306, the fifth frictional element C3 with the torque pressure that was supplied to the first port 304 whereby the shift from 3rd to 4th speed starts.

The fifth frictional element C3 is actuated by torque pressure at an initial stage of gear shifting, and is then operated by drive pressure to accomplish the fourth-speed shift at which the second, third, fourth and fifth frictional elements C1, B2, C2 and C3 are actuated to complete the 4th-speed shift. The power train then runs at the 4th speed by the operation of the second, third, fourth and fifth frictional elements C1, B2, C2 and C3.

When the 1st, 2nd, 3rd and 4th -speed shift is attained in the "D" range, an overdrive is turned on, and when the overdrive is being turned off, gear shifting may be accomplished in the same manner but its gear ratio is limited to 3rd speed. In addition, gear shifting is achieved in "2" and "L" ranges by the hydraulic pressure provided to the frictional elements as indicated in FIG. 7. At the 2nd speed of the "2" range, the first and second frictional elements B1 and C1 are actuated, and the first, second, third and sixth frictional elements B1, C1, B2 and B3 are operated at the 2nd speed. The first, second and seventh frictional elements B1, C1 and B4 are actuated in the "L" range to accomplish gear shifting thereby.

Unlike the cases at the 2nd and 1st speeds of the "D" range, the sixth and seventh frictional elements B3 and B4 are actuated at 2nd speed of the "2" range and in the "L" range, which leads to the operation of brake systems.

Skip shifting from 4th to 2nd speed, from 4th to 1st speed, and from 3rd to 1st speed in the "D" range, may be applied to the inventive hydraulic control system, skipping the medium range, and the downshift from 4th to 2nd speed may be attained, skipping 3rd speed. When manual shifting from 4th speed of the "D" range to the "2" range, or from 3rd speed of "D" range to "L" range, gear shifting is controlled to skip the medium range.

When the shift mode is changed to the "R" range, the hydraulic pressure produced from the manual valve 22 is applied to the seventh frictional element B4 through the reverse hydraulic pressure passage 51 and partially through the second and third ports 166 and 168 of the N-R control valve 160, and the other part of the hydraulic pressure is provided to the fifth frictional element C3.

At the same time, part of the hydraulic pressure of the line pressure passage 14 is supplied to the first frictional element B1 through the third clutch valve 48. The first and second ports 162 and 166 of the N-R control valve 160 are supplied with hydraulic pressure, and since the third solenoid valve S3 is turned off, its valve spool is moved to the left end as viewed in the drawing so that the second port 166 communicates with the third port 168 to provide the reverse hydraulic pressure to the seventh frictional element B4.

Figure 12:
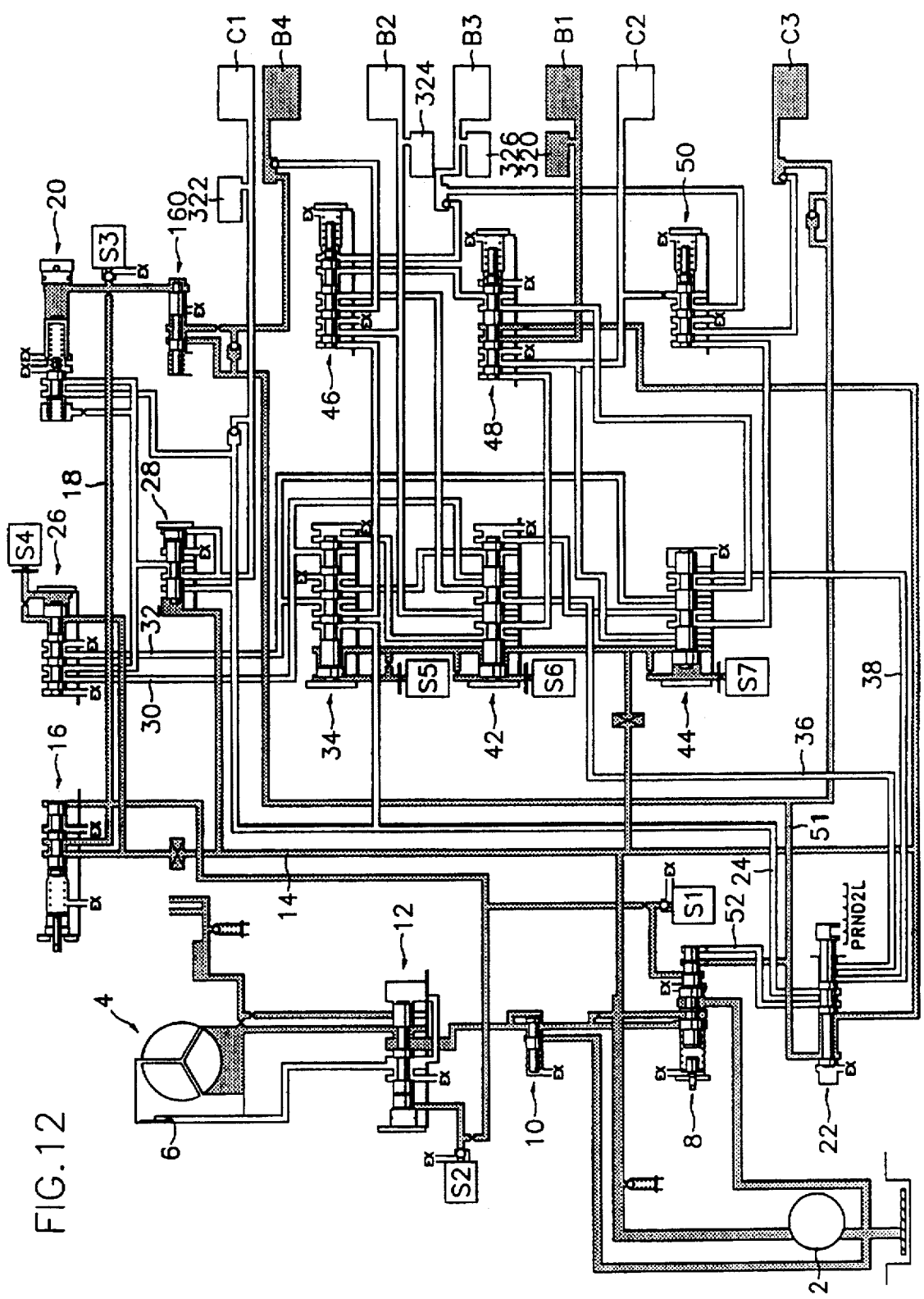
FIG. 12 is a circuit diagram for the operation of a reverse-gear shift of the hydraulic control system in accordance with the present invention.

Accordingly, the operation of the first, fifth and seventh frictional elements B1, C3 and B4 in the reverse driving arrangement permits gear shifting, referring to FIG. 12. Such an operation of the first, fifth and seventh frictional elements B1, C3 and B4 in the reverse driving arrangement leads to the action of the fifth and seventh frictional elements C3 and B4 in the first speed shift control portion 400 of the power train, and the torque acting on the first shaft 404 is transferred to the second sun gear 412 through the third shaft 408.

The second sun gear 412 serves as an input element, and the second power transmission member 430 acts as a reactant according to the operation of the sixth frictional element B3. The fourth power transmission member 434 acts as an output element, and the second power transmission member 430 turns in the reverse direction to attain a reverse driving condition.

The first, second, third and sixth frictional elements B1, C1, B2 and B3 are respectively provided with the accumulators 320, 322, 324 and 326 on their supply lines whereby the impact resulting from the hydraulic pressure applied thereto may be alleviated, and the actuating hydraulic pressure may be stably controlled as well.

The torque produced at 2nd speed from the first speed shift control portion 400 when upshifting from 2nd to 3rd speed is outputted directly from the second speed shift control portion 402 to make the 3rd-speed shift. At 3rd and 4th speed, which is frequently used, only the first speed shift control portion 400 is controlled to accomplish the 4th-speed shift, which ensures the simple manipulation and excellent gear shifting responsiveness.

It will be evident to those skilled in the art that the invention is not limited to the details of the foregoing illustrative embodiments and that the present invention may be embodied in other specific forms without departing from the spirit or essential attributes thereof. The present embodiments are therefore to be considered as illustrative and not restrictive.

What is claimed is:

1. A hydraulic control system for automatic transmission systems comprising:

an oil pump coupled to a vehicle engine for generating hydraulic pressure;

a pressure control valve configured to vary the hydraulic pressure from said oil pump depending on a driving condition of the vehicle;

a solenoid supply valve providing first, second and third solenoid valves with hydraulic pressure supplied through line pressure passages from said pressure control valve;

a manual valve having a port conversion carried out by selecting a position of a shift lever, to provide hydraulic pressure to a drive pressure passage in a drive "D" range, and provide hydraulic pressure to a reverse hydraulic pressure passage in a reverse "R" range;

a torque control regulator valve having a duty ratio controlled by said third solenoid valve to convert the hydraulic pressure provided from said manual valve into torque pressure;

a control switch valve alternatively supplying the torque pressure provided from said torque control regulator valve to first and second torque pressure passages in response to turning on or turning off said fourth solenoid valve;

an N-D control valve providing torque pressure to a second frictional element geared to a first frictional element actuated by line pressure of initial gear-shifting stage to prevent shock from being given to said second frictional element when the position of the shift lever is changed from a neutral "N" range to the drive "D" range;

a 1st–2nd speed shift valve whose port conversion is carried out by ON/OFF control of a fifth solenoid valve when shifting from a 1st to a 2nd speed of the "D" range to provide a second clutch valve with the hydraulic pressure from said manual valve and the torque pressure from the second torque pressure passage;

a 2nd–3rd speed shift valve having a port conversion carried out by ON/OFF control of a sixth solenoid valve when shifting from a 2nd to a 3rd speed of the "D" range to provide a third clutch valve with a part of the hydraulic pressure from said third frictional element and the torque pressure from the 1st–2nd speed shift valve;

a 3rd–4th speed shift valve having a port conversion carried out by ON/OFF control of a seventh solenoid valve when shifting from a 3rd to a 4th speed of the "D" range to provide a fourth clutch valve with a part of the hydraulic pressure from said fourth frictional element and the torque pressure from the 2nd–3rd speed shift valve;

a second clutch valve providing the third frictional element with the hydraulic pressure from said 2nd–3rd speed shift valve when shifting from the 1st to the 2nd speed of the "D" range, and providing the seventh frictional element with the hydraulic pressure from said 3rd–4th speed shift valve when the shift mode is changed to the "L" range;

a third clutch valve providing the fourth frictional element with the hydraulic pressure from the 3rd–4th speed shift valve when shifting from the 2nd to the 3rd speed of the "D" range, and providing the sixth frictional element with the hydraulic pressure supplied from said 3rd–4th speed shift valve through the second clutch valve at a 2nd speed of a "2" range;

a fourth clutch valve providing a fifth frictional element with the hydraulic pressure from the 3rd–4th speed shift valve when shifting from the 3rd to the 4th speed of the "D" range, and providing the sixth frictional element with part of the hydraulic pressure supplied to the third frictional element when shifting from 2nd to 3rd speed; and an N-R control valve having a port conversion carried out by ON/OFF control of the third solenoid valve when the shift mode is changed to the "R" range to provide the seventh frictional element with the hydraulic pressure from said manual valve through the reverse hydraulic pressure passage.

2. The hydraulic control system as set forth in claim 1, wherein said 1st–2nd speed shift valve includes a valve body and a valve spool;

said valve body having first and second ports respectively provided with said first and second torque pressure passages, a third port providing one port of the 2nd–3rd speed shift valve with the hydraulic pressure applied to said first port, a fourth port providing another port of the 2nd–3rd speed shift valve with the hydraulic pressure applied to said second port, a fifth port supplied with the hydraulic pressure from the 2nd–3rd speed shift valve through the line pressure passage, a sixth port provided with the hydraulic pressure regulated by ON/OFF control of the fifth solenoid valve, a seventh port provided with the hydraulic pressure from the drive pressure passage, and a seventh port providing the second clutch valve with the hydraulic pressure applied to said seventh port; and said valve spool having a first land which the hydraulic pressure supplied to said fifth and sixth ports acts over on both sides, a second land on which the hydraulic pressure of the seventh port acts, a third land allowing the eighth port to either communicate with or be shut off from the seventh port, a fourth land allowing the second port to alternatively communicate with the seventh or eighth port, a fifth land which part of the hydraulic pressure flowing to the first port acts on, and a sixth land which the hydraulic pressure applied to the third port acts on.

3. The hydraulic control system as set forth in claim 2, wherein said 2nd–3rd speed shift valve includes a valve body and a valve spool;

said valve body having a first port connected to the third port of said 1st–2nd speed shift valve to be supplied with the hydraulic pressure, a second port connected to the fourth port of said 1st–2nd speed shift valve to be supplied with the hydraulic pressure, a third port supplied with the hydraulic pressure of the line pressure passage, a fourth port supplying the hydraulic pressure of the third port to the fifth and sixth ports of the 1st–2nd speed shift valve, a fifth port supplied with the line pressure of the fourth port regulated by the sixth solenoid valve, a seventh port selectively supplying the third clutch valve with the hydraulic pressure of the first and sixth ports, an eighth port directly communicating with the first torque pressure passage, a ninth port communicating with the passage to which hydraulic pressure is provided in the "L" range, a tenth port providing the hydraulic pressure of the sixth port to the third clutch valve, and an eleventh port providing the hydraulic pressure of the second port to any one of ports of the 3rd–4th speed shift valve; and said valve spool having a first land which the hydraulic pressure of the third and fifth ports acts over on both sides, a second land which a part of the hydraulic pressure provided to the first port acts over, a third land allowing the sixth port to alternatively communicate with the tenth port, a fourth land allowing the seventh port to alternatively communicate with the eighth port, and a fifth land allowing the second port to alternatively communicate with the eleventh port.

4. The hydraulic control system as set forth in claim 1, wherein said 3rd–4th speed shift valve includes a valve body and a valve spool;

said valve body having a first port provided with the hydraulic pressure from the eleventh port of the 2nd–3rd speed shift valve, a second port provided with pressure applied to the pressure applied to the fourth frictional element, a third port connected to the second torque pressure passage, a fourth port provided with hydraulic pressure from the line pressure passage, a fifth port provided with the hydraulic pressure regulated by ON/OFF control of the fifth solenoid valve, a sixth port providing the fourth clutch valve with the hydraulic pressure of the first port, a seventh port provided with hydraulic pressure from said manual valve in "2" and "L" ranges, and an eighth port providing the hydraulic pressure of the seventh port to the sixth frictional element via the third and second clutch valves; and said valve spool having a first land which the hydraulic pressure provided to both the fourth and fifth ports acts on, a second land which a part of the hydraulic pressure applied to the second port acts on, a third land allowing the third port to alternatively communicate with the eighth port, and a fourth land allowing the seventh port to alternatively communicate with the eighth port.

5. The hydraulic control system as set forth in claim 4, wherein said second clutch valve includes a valve body and a valve spool;

said valve body having a first port provided with the hydraulic pressure from the 1st–2nd speed shift valve, a second port providing the hydraulic pressure of the first port to the third frictional element and 2nd–3rd speed shift valve, a third port provided with the hydraulic pressure from the seventh port of the 2nd–3rd speed shift valve, a fourth port providing the hydraulic pressure of the third port to the seventh frictional element, a fifth port communicating with any one of ports of the third clutch valve to be provided with hydraulic pressure, and a sixth port providing the hydraulic pressure applied to the fifth port to the sixth frictional element; and said valve spool having a first land allowing the first port to alternatively communicate with the second port, a second land allowing the third port to alternatively communicate with the fifth port, a third land allowing the third port to be shut off from the fifth port, and a fourth land allowing the fifth port to alternatively communicate with the sixth port.

6. The hydraulic control system as set forth in claim 5, wherein said third clutch valve includes a valve body and a valve spool;

said valve body having a first port provided with the hydraulic pressure from said 2nd–3rd speed shift valve, a second port providing the hydraulic pressure of the first port to the fourth frictional element and 3rd–4th speed shift valve, a third port provided with the drive pressure of the manual valve in the drive "D" range, a fourth port providing the hydraulic pressure of the third port to the first frictional element, a fifth port communicating the eighth port of the 3rd–4th speed shift valve, and a sixth port providing the hydraulic pressure of the fifth port to the fifth port of the second clutch valve; and said valve spool having a first land allowing the first port to alternatively communicate with the second port, a second land allowing the third port to alternatively communicate with the fourth port, and a third land suspended by an elastic member.

7. The hydraulic control system as set forth in claim 6, wherein said fourth clutch valve includes a valve body and a valve spool;

said valve body having a first port provided with the hydraulic pressure from the 3rd–4th speed shift valve, a second port providing the hydraulic pressure of the first port to the fifth frictional element, a third port provided with a part of the hydraulic pressure applied to the fourth frictional element, and a fourth port providing the hydraulic pressure of said third port to the sixth frictional element; and said valve spool having a first land allowing the first port to alternatively communicate with the second port, a second land allowing the third port to alternatively communicate with the fourth port, and a third land suspended by an elastic member.

8. The hydraulic control system as set forth in claim 1, wherein the hydraulic pressure of the line pressure passage is provided through the third clutch valve in a manner that said first frictional element is actuated at every shift mode other than the 2nd and the 4th speeds of the drive "D" range.

9. The hydraulic control system as set forth in claim 1, wherein said fifth frictional element is directly supplied with actuating hydraulic pressure from the manual valve in the reverse "R" range, and is provided with hydraulic pressure from the fourth clutch valve at the 4th speed of the drive "D" range.

10. The hydraulic control system as set forth in claim 1, wherein said sixth frictional element is supplied with hydraulic pressure from the fourth clutch valve at the 3rd speed of the drive "D" range, and is provided with hydraulic pressure from the second clutch valve at the 2nd speed of the "2" range.

11. The hydraulic control system as set forth in claim 1, further comprising accumulators provided in each supply line of the first, second, third and sixth frictional elements for alleviating shock caused from gear shifting and stabilizing the actuating hydraulic pressure.

* * * * *

UNITED STATES PATENT AND TRADEMARK OFFICE
CERTIFICATE OF CORRECTION

PATENT NO.: 5,720,694

DATED: February 24, 1998

INVENTOR(S): Jaeduk Jang

It is certified that an error appears in the above-identified patent and that said Letters Patent is hereby corrected as shown below:

In Claim 4, Col. 17, line 6, after "provided with", insert --a part of the hydraulic--.

Signed and Sealed this

Fifth Day of May, 1998

*Attest:*

BRUCE LEHMAN

*Attesting Officer*    *Commissioner of Patents and Trademarks*